US009030482B2

(12) United States Patent
Han et al.

(10) Patent No.: US 9,030,482 B2
(45) Date of Patent: May 12, 2015

(54) HYBRID DISPLAY FRAME BUFFER FOR DISPLAY SUBSYSTEM

(71) Applicants: Kyungtae Han, Portland, OR (US); Paul S. Diefenbaugh, Portland, OR (US); Taemin Kim, Portland, OR (US); Nithyananda S. Jeganathan, Portland, OR (US); Sameer Abhinkar, Portland, OR (US)

(72) Inventors: Kyungtae Han, Portland, OR (US); Paul S. Diefenbaugh, Portland, OR (US); Taemin Kim, Portland, OR (US); Nithyananda S. Jeganathan, Portland, OR (US); Sameer Abhinkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 13/673,961

(22) Filed: Nov. 9, 2012

(65) Prior Publication Data

US 2014/0132616 A1 May 15, 2014

(51) Int. Cl.

*G09G 5/397* (2006.01)
*G06F 13/00* (2006.01)
*G09G 5/36* (2006.01)
*G09G 5/399* (2006.01)
*G09G 5/39* (2006.01)

(52) U.S. Cl.

CPC .................. *G09G 5/399* (2013.01); *G09G 5/39* (2013.01); *G09G 5/397* (2013.01); *G09G 2320/103* (2013.01); *G09G 2330/021* (2013.01); *G09G 2360/18* (2013.01)

(58) Field of Classification Search

CPC ....... G06T 7/2053; H01L 45/06; G06F 3/068; G09G 5/397

USPC .......... 345/530, 536, 545, 546, 547, 629, 638

See application file for complete search history.

(56) References Cited

U.S. PATENT DOCUMENTS

| | | | | |
|---|---|---|---|---|
| 5,185,666 | A | 2/1993 | Capitant et al. | |
| 5,848,201 | A | 12/1998 | Kajiwara | |
| 6,967,666 | B1 * | 11/2005 | Koda | 345/638 |
| 6,977,664 | B1 * | 12/2005 | Jinzenji et al. | 345/629 |
| 7,774,556 | B2 * | 8/2010 | Karamcheti et al. | 711/146 |
| 7,911,665 | B1 * | 3/2011 | Borg | 358/518 |
| 8,589,665 | B2 * | 11/2013 | Carter et al. | 712/229 |

(Continued)

FOREIGN PATENT DOCUMENTS

KR 10-2011-0018523 2/2011

OTHER PUBLICATIONS

"Phase-change memory Altered states". Sep. 1, 2012. The Economist. www.economist.com/node/21560981.*

(Continued)

*Primary Examiner* — Joni Richer

(74) *Attorney, Agent, or Firm* — Blakely, Sokoloff, Taylor & Zafman LLP

(57) ABSTRACT

A hybrid display frame buffer for a display subsystem. An embodiment of an apparatus a first logic to split a video image into a first data portion and a second data portion; a display frame buffer including a first memory component having a first type of memory and a second memory component having a second type of memory, the first logic to write the first data portion to the first memory component and the second data portion to the second memory component; and a second logic to read the first data portion from the first memory component and the second data component from the second memory component, and to combine the first data portion and the second data portion to generate a combined video image.

21 Claims, 8 Drawing Sheets

(56) References Cited

U.S. PATENT DOCUMENTS

| | | | | |
|---|---|---|---|---|
| 8,650,089 | B2 * | 2/2014 | Laster-Fields | 705/26.1 |
| 2007/0040159 | A1 * | 2/2007 | Wang | 257/3 |
| 2008/0106506 | A1 | 5/2008 | Doser et al. | |
| 2008/0150964 | A1 * | 6/2008 | Cho | 345/629 |
| 2009/0172439 | A1 | 7/2009 | Cooper et al. | |
| 2012/0013757 | A1 | 1/2012 | Beckers et al. | |
| 2012/0311262 | A1 * | 12/2012 | Franceschini et al. | 711/118 |
| 2013/0173942 | A1 | 7/2013 | Forristal et al. | |

OTHER PUBLICATIONS

Han, Kyungtae et al., “A Hybrid Display Frame Buffer Architecture for Energy Efficient Display Subsystems,” Symposium on Low Power Electronics and Design, IEEE, 2013, 6 pages.

International Search Report and Written Opinion of the International Searching Authority dated Oct. 14, 2013, in International Patent Application No. PCT/US2013/047433, 11 pages.

Official Letter dated Feb. 13, 2015 (+ English translation), in Taiwan Patent Application No. 102139330, 21 pages.

* cited by examiner

HYBRID DISPLAY FRAME BUFFER FOR DISPLAY SUBSYSTEM

TECHNICAL FIELD

Embodiments of the invention generally relate to the field of electronic devices and, more particularly, a hybrid display frame buffer for a display subsystem.

BACKGROUND

A display subsystem for an electronic device such as a mobile device may consume a significant amount of power due to the large amount of data transfer between the image data generator, such as an application processor, to a display device, such as and LCD (Liquid Crystal Display) panel, via a display frame buffer that temporarily stores image data. For this reason, minimizing the power consumption of the data transfer is a key factor in the design of a low power mobile device.

For example, techniques exist for reduction in the amount of data transfer. Display Selective (or Partial) Update (DSU) reduces the amount data transfer by transferring only a partial frame that includes data that differs from the previous frame, with a display frame buffer being inserted to retain the data for a full frame. In this manner, the amount of data that is transferred between the image generator and the display device is reduced, which leads to a reduction in the overall power consumption for the display transfer.

However, techniques to reduce the amount of data transferred does not directly address the power that is consumed by the display frame buffer in display operation, which is a significant power cost in the operation of a mobile device that has a limited power source. The increasing resolution of displays in mobile devices requires additional data, and thus additional power is required for the reading and writing of such data in the display frame buffer.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
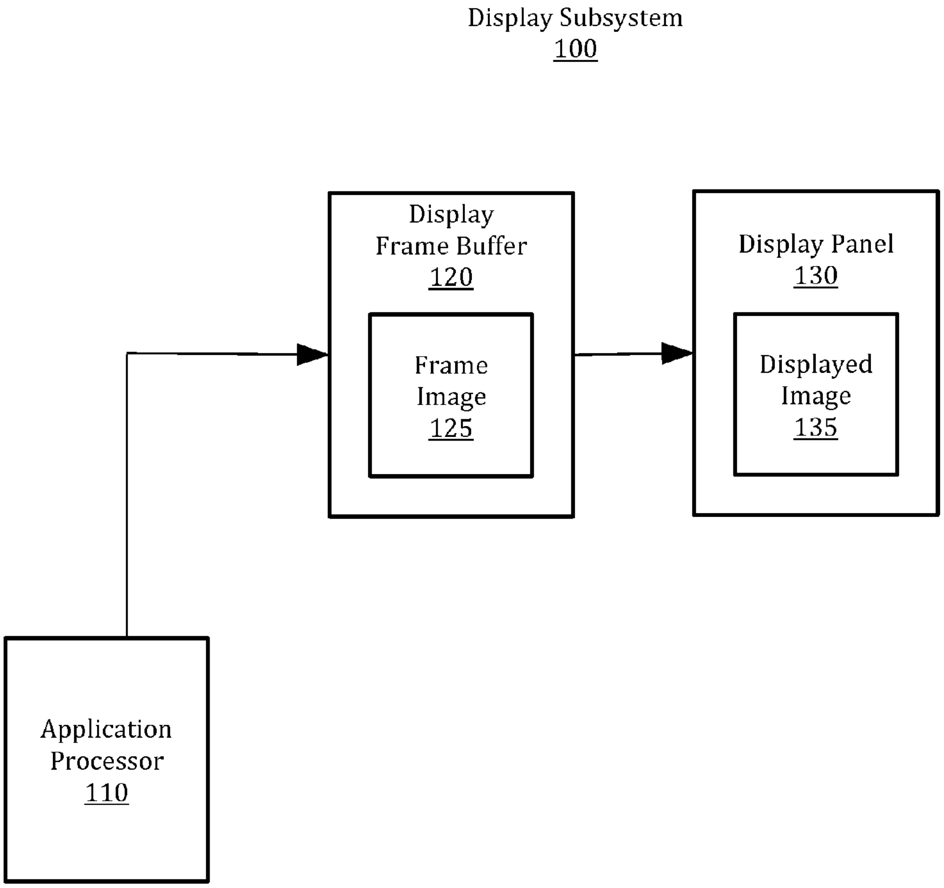
Prior Art Fig. 1
FIG. 1 is an illustration of a conventional display subsystem.

Embodiments of the invention are generally directed to a hybrid display frame buffer for a display subsystem.

As used herein:

"Mobile device" means an electronic device that may be transported by a user. Mobile devices include handheld electronic device, cellular telephones and smart phones, tablet computers, laptop and notebook computers, handheld computers, mobile Internet devices, mobile gaming devices, electronic book readers (e-book readers), and other mobile devices.

"Display frame buffer" means a component or element including memory for temporary storage of image data for transmission to a display.

With increasing resolution and other improvements in displays and related elements of electronic apparatuses and systems, including the displays found in mobile devices, and the resulting increase in usage of devices for the delivery of video content, there is an increasing amount of video data that is provided to video displays of devices. The energy consumed by display frame buffers has increased significantly with each new generation of display panels, where such displays have higher resolution and high numbers of accesses to the display frame buffer per frame. In an example, raising the resolution of a display subsystem from 1024×768 pixels to 2048×1536 pixels results in a larger display with four times the memory traffic, and the larger size and increase in traffic results in an increase in the energy consumption of the platform. Such data is buffered prior to display on the display panel, and thus the power consumption of the display frame buffer can have a significant impact on the overall power consumption of an apparatus or system.

A computer display subsystem is one of the largest power consuming components in a mobile device, and the display frame buffer associated with the display is a key component of this subsystem. The display frame buffer stores display content temporarily, and at a periodic interval the display frame buffer contents are transported to the display panel to be displayed. In most usage scenarios display frame buffer contents do not change often and the read activity from the display frame buffer is thus significantly higher than the write activity.

In some embodiments, because of the read dominant nature of the display pipeline, a hybrid display frame buffer including a read-efficient memory may be utilized to improve power efficiency of the display subsystem. In some embodiments, an apparatus, method, and system provide for a hybrid display frame buffer for a display system, where the hybrid display frame buffer may be utilized to reduce power consumption in the display operation of an apparatus or system, including a mobile device.

A display frame buffer normally utilizes conventional memory, such as DRAM (Dynamic Random Access Memory) and SRAM (static random access memory), for the buffer memory. As such, the buffer memory requires a similar amount of energy for read and write accesses, which is referred to herein as a symmetric characteristic for power consumption for the read accesses and write accesses. However, in many cases, the number of read accesses will be much greater than the number of write accesses, which may be referred to as an asymmetric access pattern.

In some embodiments, a display frame buffer provides for less power in a read access than a write access, which cannot be accomplished with conventionally applied memory such as DRAM and SRAM because of the symmetric power characteristic of such memory for read and write accesses. In some embodiments, a hybrid display frame buffer architecture consumes significantly less power in read accesses than write accesses, which may be referred to as an asymmetric power characteristic for read and write accesses. In some embodiments, the frame architecture exploits an asymmetric access pattern in the display subsystem to reduce power consumption in the display subsystem using memory having an asymmetric power characteristic for read and write accesses.

In some embodiments, a hybrid display frame buffer includes a second, different type of memory as an additional frame buffer or additional component or element of the frame buffer, where the second type of memory has an asymmetric power characteristic of such memory for read and write accesses, read accesses requiring less power than write accesses. In some embodiments, a hybrid display frame buffer has a hybrid structure in which the memory includes a first type of memory with a symmetric power characteristic and a second type of memory with an asymmetric power characteristic. An asymmetric power characteristic may include an operation in which the power consumption for a write access is a multiple (two times or more) of the power consumption of a read access. In contrast, a symmetric power characteristic may include an operation in which the power consumption for write accesses and read accesses are similar, such as a write access is less than a multiple (less than twice) of the power consumption of a read access.

In some embodiments, a display frame buffer includes Phase Change Memory (PCM). PCM is a non-volatile memory. PCM may be referred to as a storage-type memory, where a storage-type memory provides for low power access to stored data. PCM consumes less energy in read accesses than in write accesses because PCM needs significantly more power to change the state of the PCM structure. Because of the read-power efficient property of PCM, PCM is a good candidate for application in read dominant scenarios in which the number of read accesses is much higher than the number of write accesses.

A comparison of the estimated power consumption in terms of picoJoules per bit of DRAM and PCM memory accesses is shown in Table 1.

TABLE 1

Energy Consumption for Read and Write in DRAM and PCM

| Memory Type | DRAM | PCM |
|---|---|---|
| Read Energy (pJ/bit) | 4.4 | 2.47 |
| Write Energy (pJ/bit) | 5.5 | 14.03 or 19.73 |

As shown in Table 1, PCM consumes a relatively small amount of energy during read operations in comparison to write operations, the energy consumed in write operations being a multiple of the energy consumed in read operations, and thus there is an asymmetric power characteristic for read and write accesses. In comparison, the energy consumed in write operations for a DRAM is approximately 23% percent greater than the energy consumed in write operations, which is a symmetric power characteristic for read and write accesses. In comparing the two types of memory for a particular operation, the PCM provides a significant energy savings in comparison with DRAM for read accesses. However, DRAM provides a significant energy savings in comparison with PCM for write accesses.

In some embodiments, an apparatus, method, or system utilizes a hybrid memory structure containing memory with differing power characteristics to allocate display contents for reduction in power consumption. In some embodiments, a hybrid memory structure includes a first memory component or element comprising a first type of memory, where the first type of memory is memory having a symmetric power characteristic for read and write access, and includes a second memory component or element comprising a second type of memory, where the second type of memory is memory having an asymmetric power characteristic for read and write access. In some embodiments, the first type of memory is DRAM or SRAM and the second type of memory is PCM. However, embodiments are not limited to these particular memory technologies, In some embodiments, the hybrid memory structure is operable to allocate a first set of data to the first memory portion and a second set of data to the second memory portion. In some embodiments, the first set of data may include data in which there is a relatively high number of data writes in comparison with data reads, such as video data with a high rate of change, and the second set of data may include data in which there is a relatively low number of data writes in comparison with data reads, such as video data with a low rate of change.

An example of read-dominancy in a display frame buffer is an office computer application. In office computing, a large area of a screen commonly has static content that does not change for a long period of time. The application processor does not update the display frame buffer area corresponding to the static area of a screen. However, the panel frequently reads the display frame buffer to hold the screen image. This is in effect produces a higher read rate than write rate in the display frame buffer memory.

In a further example, low active content such as web browsing will have an energy benefit with a PCM memory buffer architecture. On the other hand, with high active content such as video games, and particularly 3D video games, video playback would cause increased power consumption if PCM is used instead of DRAM or other similar memory. In some embodiments, a hybrid display frame buffer architecture provides for low active content data to be directed to PCM and high active content to be directed to DRAM.

For the purposes of a hybrid display frame buffer, content separation may be challenging because of the difficulty for hardware to identify which software content is active or idle without monitoring the display. In some embodiments, as highly active content goes to a graphics engine and video engine, the graphics and video drivers can provide information to a splitter with regard to a split between active and idle content in a video image.

There are certain challenges in the usage of PCM memory, and a display frame buffer may include architecture and operations to address the particular characteristics of PCM. For example:

Speed—PCM is relatively low speed memory compared to DRAM. The write bandwidth of DRAM is approximately 1 GB/s (gigabyte per second) per die, while PCM has a write bandwidth of approximately 50-100 MB/s (megabyte per second) per die. The required bandwidth of a display frame buffer may be approximately 94 MB/s for XGA (1024×768 pixels×16 bpp (bits per pixel)×60 fps (frames per second)) and 373 Mb/s for FullHD (1920×1080 pixels×16 bpp×60 fps). In some embodiments, in order to achieve higher bandwidths in a display system, parallel use of PCM may be implemented. However, as PCM products with a greater bandwidth are produced, such parallel use or other means to increase effective speed may not be required in the use of PCM.

Lifespan—PCM has a limited write endurance of approximately $10^7$ (ten million) writes per bit cell before failure. In some embodiments, to address the limited lifespan of PCM an apparatus or system may utilize one or more techniques to improve the effective life of the PCM, including: (1) Read-before-write—To reduce the write activity when the write data is the same as the read data, write activity induces or triggers read activity to compare the stored data with the write data. If the write data is the same as the existing stored data, then the write command is ignored, thus reducing the memory write activity and increasing lifespan. (2) Frame buffer compression—Frame buffer compression is a technique to reduce the size of write data by compression. There may be spatial redundancy in display contents, and frame buffer compression may exploit this property and thus reduce the size of write data to the PCM. This operation thus reduces the number of write operations per bit cell. (3) Wear leveling—Wear leveling is a technique to prolong the lifespan of erasable computer storage media, and may include remapping a block of memory in a block having a high erase count to an available erase block with a lower erase count, or other wear leveling techniques.

FIG. 1 is an illustration of a conventional display subsystem. In this simplified illustration, a display subsystem 100 may receive image data from an application processor 110 or other processing element that generates or processes image data. The application processor 110 is coupled with a display frame buffer 120 of the display subsystem, where the display frame buffer includes DRAM for the storage of frame images from the application processor 110. In operation, the application processor 110 generates frame images, such as a frame image 125, and stores the frame images in the display frame buffer. The display frame buffer 120 is coupled with a display panel 130, such as and LCD display, where the frame image 125 is read from the display frame buffer 120 for display as a displayed image 135 on the display panel 130. The display subsystem 100 may be a portion of a mobile device, including, for example, a display subsystem of a laptop or notebook computer. In the conventional display frame buffer, there is a single type of memory to write and read an image, thus a homogeneous frame buffer.

However, the display frame buffer 120 will consume a significant amount of power in display operation, particularly if there are a large number of reads of data because each data read will consume an amount of energy that is similar to the energy consumed in writing the data.

Figure 2:
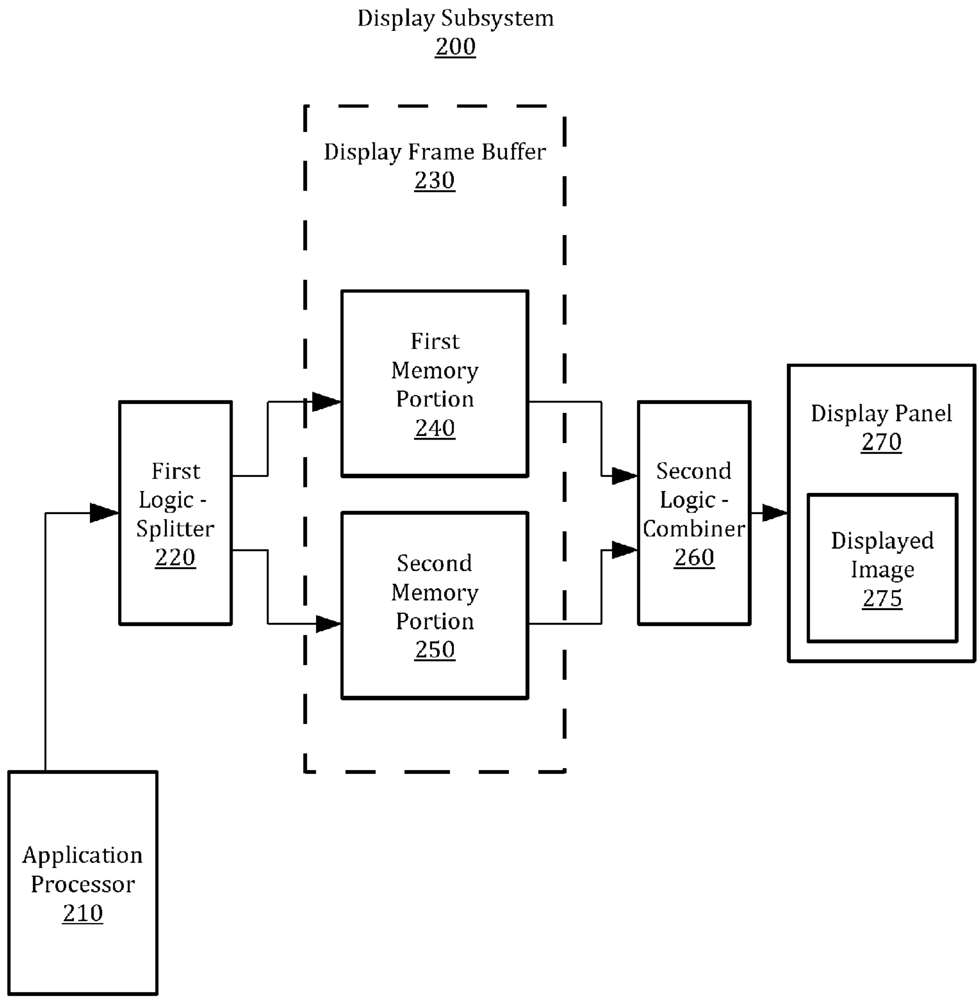
FIG. 2 is an illustration of an embodiment of a display subsystem including a hybrid display frame buffer.

FIG. 2 is an illustration of an embodiment of a display subsystem including a hybrid display frame buffer. In some embodiments, a display subsystem 200 includes a first logic to split a video image, shown as signal splitter 220; a hybrid display frame buffer 230 having a plurality of heterogeneous memory portions, the memory portions including a first memory component 240 and a second memory component 250; a second logic to combine data to generate a combined video image, shown as signal combiner 260; and a display panel 270. In some embodiments, the first memory component 240 is composed of a first type of memory, where the first type of memory is memory having a symmetric power characteristic for read and write access, and the second memory component 250 is composed of a second type of memory, where the second type of memory is memory having an asymmetric power characteristic for read and write access. In some embodiments, the first type of memory is DRAM or SRAM and the second type of memory is PCM or other storage memory.

In operation, an application processor 210 or other element generates frame images and provides the frame images to the splitter 220 for allocation of certain frame images or certain portions of frame images to each portion of the display frame buffer, such as a first type of data being stored in the first memory portion 240 and a second type of data being stored in the second memory portion 250. In some embodiments, the splitter 220 identifies dynamic data (referring to more active data) for storage in the first memory portion 240, where the dynamic data may be a dynamic region of an image, and static data (referring to less active data) for storage in the second memory portion 250, where the static data may be a static region of the image. The identification of the different regions of the image may be obtained from software, such as an application, operating system (OS), or driver, or hardware that detects the static and dynamic regions of an image. In an example, a web page may contain an embedded active or dynamic flash image, where the flash image is stored in the first memory portion and the rest of the web page is stored in the second memory portion. In the case of DRAM as the first memory type and PCM as the second memory type, the DRAM will contain dynamic data, such data being data that is subject to a relatively high number of write operations, and the PCM will contain static data, such data being data that is subject to a relatively low number of write operations.

In some embodiments, the combiner 260 reads the image from the first memory component 240 and the second memory component 250 and combines such data into a single image. In some embodiments, the combiner 260 utilizes the information regarding the different regions of the image to combine the split portions of the image back together again, where the combiner may operate according to the required refresh rate of the display panel 270. In some embodiments, the combiner 270 transmits a combined image frame to the display panel 270 to produce the displayed image 275.

While examples provided herein generally describe an image containing both dynamic and static portions, an image may contain all dynamic data or all static data. In this case, the splitter 220 may provide the entire image to either the first memory portion 240 for all dynamic data or the second memory portion 250 for all static data. The combiner 260 then may obtain the data from either the first memory portion or the second memory portion and provide such data to the display panel as the image data to provide the displayed image 275.

Further, it may be difficult to determine which content areas are high active or low active areas unless the relevant software provides information regarding such usage that can be provided to the splitter and combiner. In contrast with a web application that has a set or expected video window, some applications active regions may be changed randomly. In some embodiments, a display subsystem in such an environment may use either the first type of memory or the second type of memory for storage of the frame data, and not both, because it is difficult to determine how to split the data from each memory type.

Figure 3:
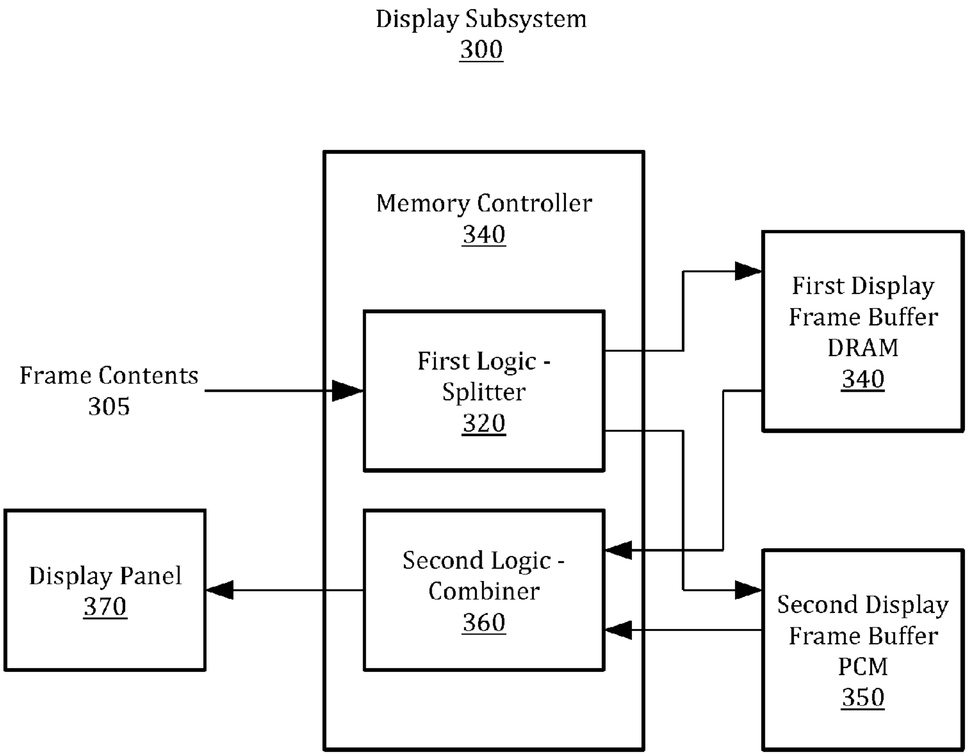
FIG. 3 is an illustration of an embodiment of a display subsystem including a hybrid display frame buffer.

FIG. 3 is an illustration of an embodiment of a display subsystem including a hybrid display frame buffer. In this alternative illustration, display subsystem 300 includes a memory controller 340, where the memory controller includes a first logic, shown as signal splitter 320, and a second logic, shown as signal combiner 360. In some embodiments, the display subsystem includes a first display frame buffer 340, the first display frame buffer including a first type of memory having a symmetric power characteristic for read and write access, the first type of memory being memory such as DRAM. The display subsystem includes further includes a second display frame buffer 350, the second display frame buffer including a second type of memory having an asymmetric power characteristic for read and write access, the second type of memory being memory such as PCM.

In some embodiments, frame contents of a video image are provided to the splitter 320 of the memory controller 340. In some embodiments, the splitter operates to separate a first type of data and a second type of data from certain frame contents 305. In some embodiments, the splitter 320 provides the first type of data to the first display frame buffer, where the first type of data is data that is changing relatively quickly. In some embodiments, the splitter 320 provides the second type of data to the second display frame buffer 350, where the second type of data is data that is changing relatively slowly.

In some embodiments, the combiner of the memory controller 340 operates to obtain the first type of data from the first frame memory buffer 340 and the second type of data from the second frame memory, combine the data into a combined image, and provide the combined image to a display panel 370 for display.

Figure 4:
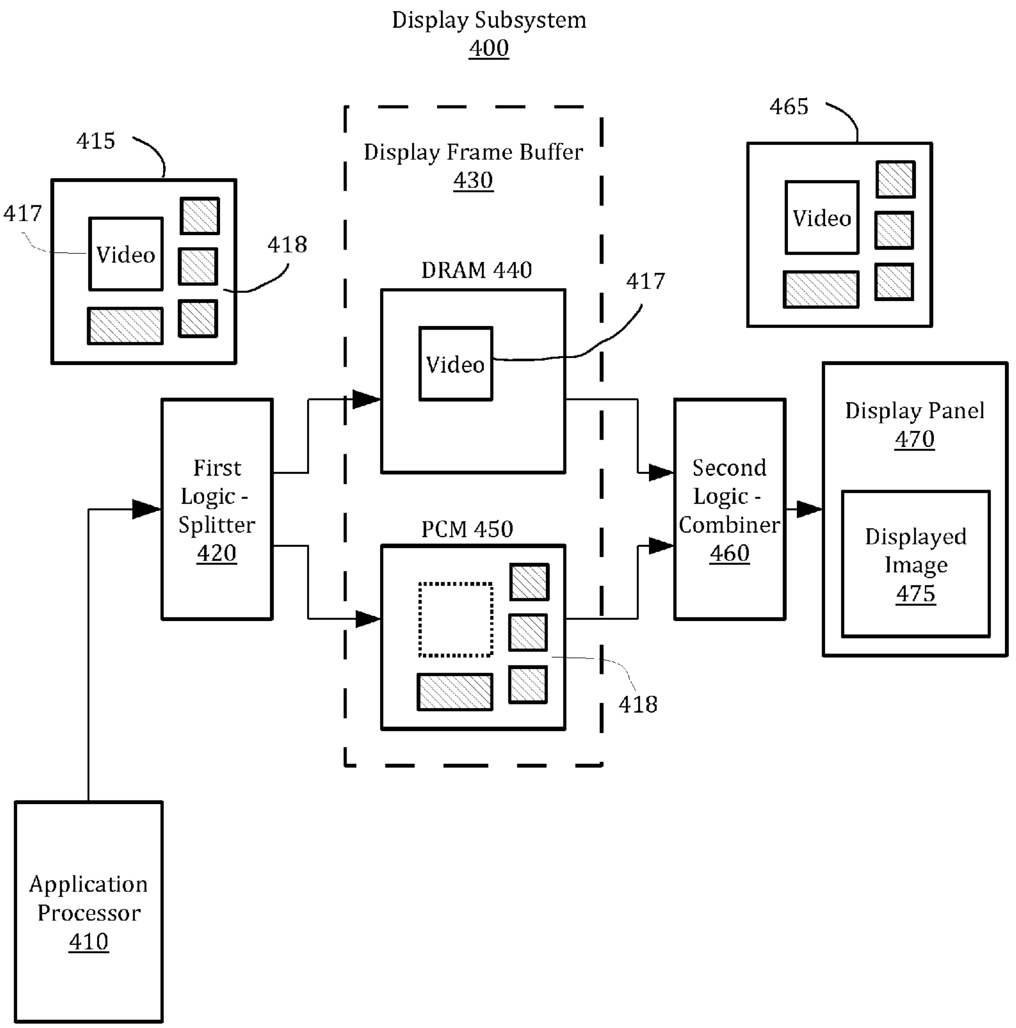
FIG. 4 is an illustration of an embodiment of a display subsystem in the handling of a video image utilizing a hybrid display frame buffer.

FIG. 4 is an illustration of an embodiment of a display subsystem in the handling of a video image utilizing a hybrid display frame buffer. In some embodiments, a display subsystem 400 includes a first logic, signal splitter 420; a hybrid display frame buffer 430 having a plurality of heterogeneous memory components, the memory components including a first memory component including DRAM 440 for the buffering of dynamic image data and a second memory component including PCM 450 for the buffering of static image data; a second logic, signal combiner 460, to combine data portions from the display frame buffer 430; and a display panel 470.

In this illustration, a video image 415 from an application processor 410 includes a dynamic portion and a static portion. In this example, the dynamic portion is a video window 417 and the static portion 418 is the remainder of the video image 415. However, this is only one example, and a video image 415 may include any combination of dynamic and static portions.

In some embodiments, the splitter 420 is operable to identify and separate the dynamic and static portions of the video image 415, and to write the dynamic portion 417 to the DRAM 440 portion of the display frame buffer 430 and the static portion 418 to the PCM 450 portion of the display frame buffer 430. In this manner, the dynamic data, which will require frequent writing of data to the memory buffer 430, is written to DRAM memory that has a relatively low energy cost for writing operations and the static data, which requires less frequent writing of data to the memory buffer, is written to PCM memory having a relatively low energy cost in read operations.

In some embodiments, the combiner 460 is operable to read the dynamic video window data 417 from the DRAM and the static data 418 from the PCM, and combine such data to generate a reconstructed video image 465 to be provided to the display panel 470 for the presentation of the displayed image 475.

Figure 5:
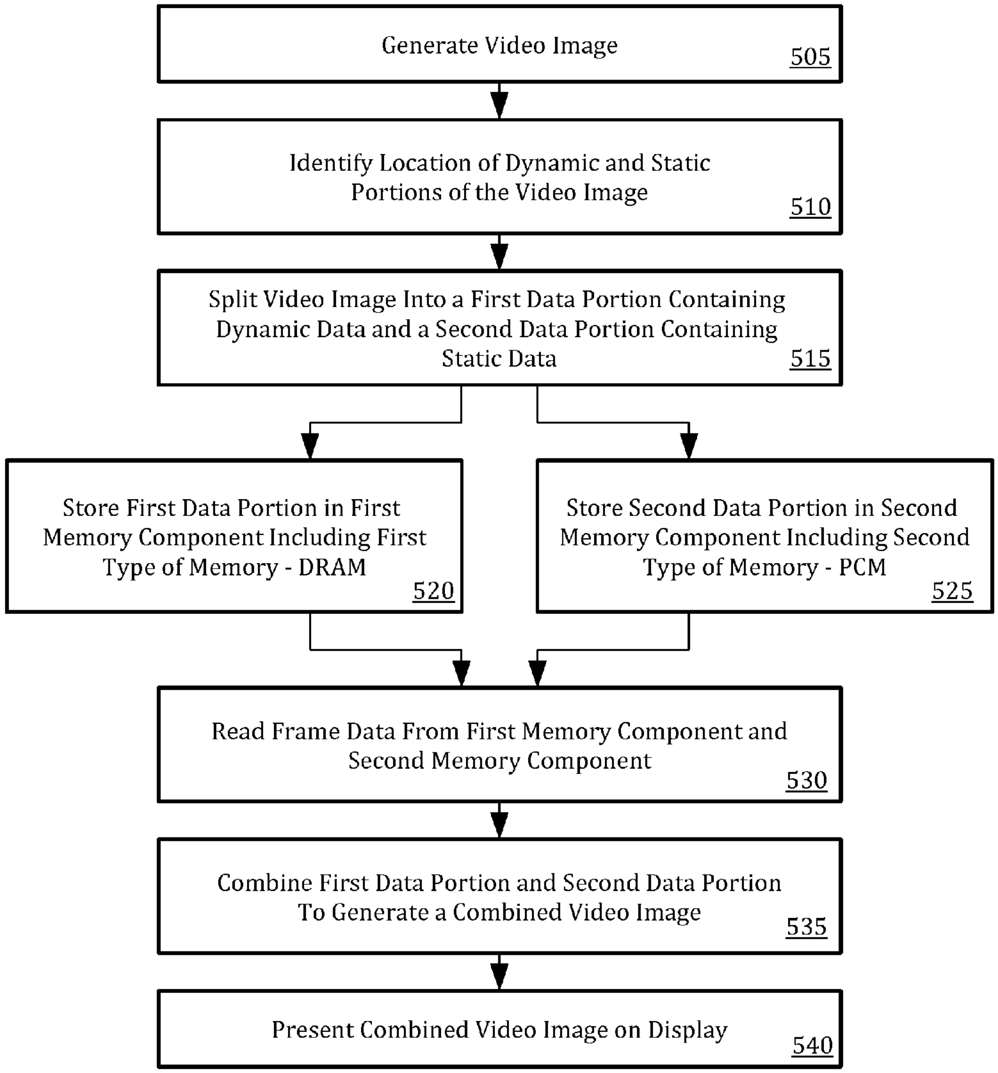
FIG. 5 is a flowchart to illustrate an embodiment of a hybrid display frame buffer operation for a display subsystem.

FIG. 5 is a flowchart to illustrate an embodiment of a hybrid display frame buffer operation for a display subsystem. In some embodiments, a video image of a stream of video data is generated 505. The video image may include any combination of dynamic and static data. In some embodiments, the location of dynamic and static data portions of the video image are identified 510, which may include determination using information obtained from software or determination by hardware analysis of the video image. In some embodiments, the video image is split into a first data portion that contains dynamic data and a second data portion that contains static data 515.

In some embodiments, the first data portion is stored in a first memory component of a hybrid display frame buffer including a first type of memory 520, wherein the first type of memory has a symmetric power characteristic for reading and writing data, and the second data portion is stored in a second memory component of the hybrid display frame buffer including a second type of memory 525, wherein the second type of memory has an asymmetric power characteristic for reading and writing data.

In some embodiments, frame data is read from the first memory component and the second memory component of the hybrid display frame buffer 530, and the first data portion from the second data portion are combined to generate a combined video image 535. In some embodiments, the combined image is then presented on a display 540.

Figure 6:
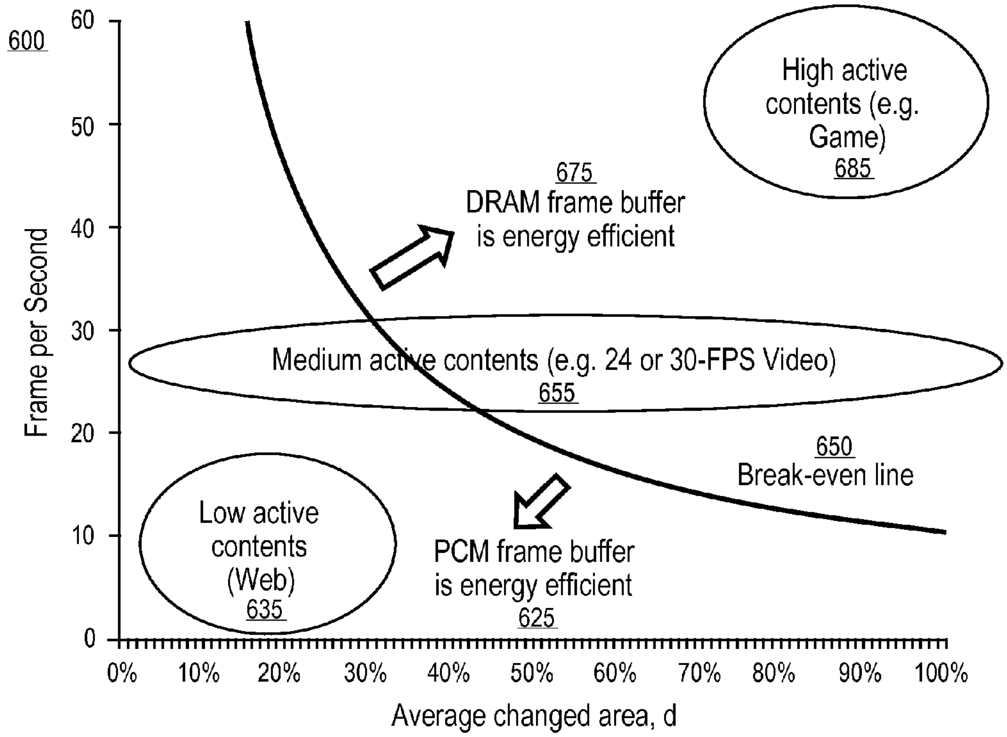
FIG. 6 is a graph to illustrate energy usage in components of an embodiment of a hybrid display frame buffer.

FIG. 6 is a graph to illustrate energy usage in components of an embodiment of a hybrid display frame buffer. In this illustration, a graph 600 illustrates data in terms of frequency of frame changes in frames per second and average area that has changed in terms of percentage. As illustrated in the graph 600, there are certain types of data content for which a DRAM frame buffer is generally more energy efficient and certain type of data content for which a PCM frame buffer is generally more energy efficient.

As illustrated, an area of the graph describing data for which the DRAM is more energy efficient 675 includes data with a higher frequency of frame changes and a larger percentage of area changed, and an area of the graph describing data for which PCM is more energy efficient 625 includes data with a lower frequency of frame changes and a lower percentage of area changed. There is a break-even line 650 in which the energy efficiency of DRAM and PCM is approximately the same. Thus, data related to the area 675 may be referred to as dynamic data, and data related to the area 625 may be referred to as static data.

For example, high active contents 685, such as video games, are more efficiently buffered using DRAM, and low active contents 635, such as web pages, are more efficiently buffered using PCM. Also illustrated are medium active contents 655, such as videos at 24 or 30 frames per second, which may be more efficiently buffered with PCM if an average percentage of area that is changed is small and more efficiently buffered with DRAM if an average percentage of area that is changed is large.

Figure 7:
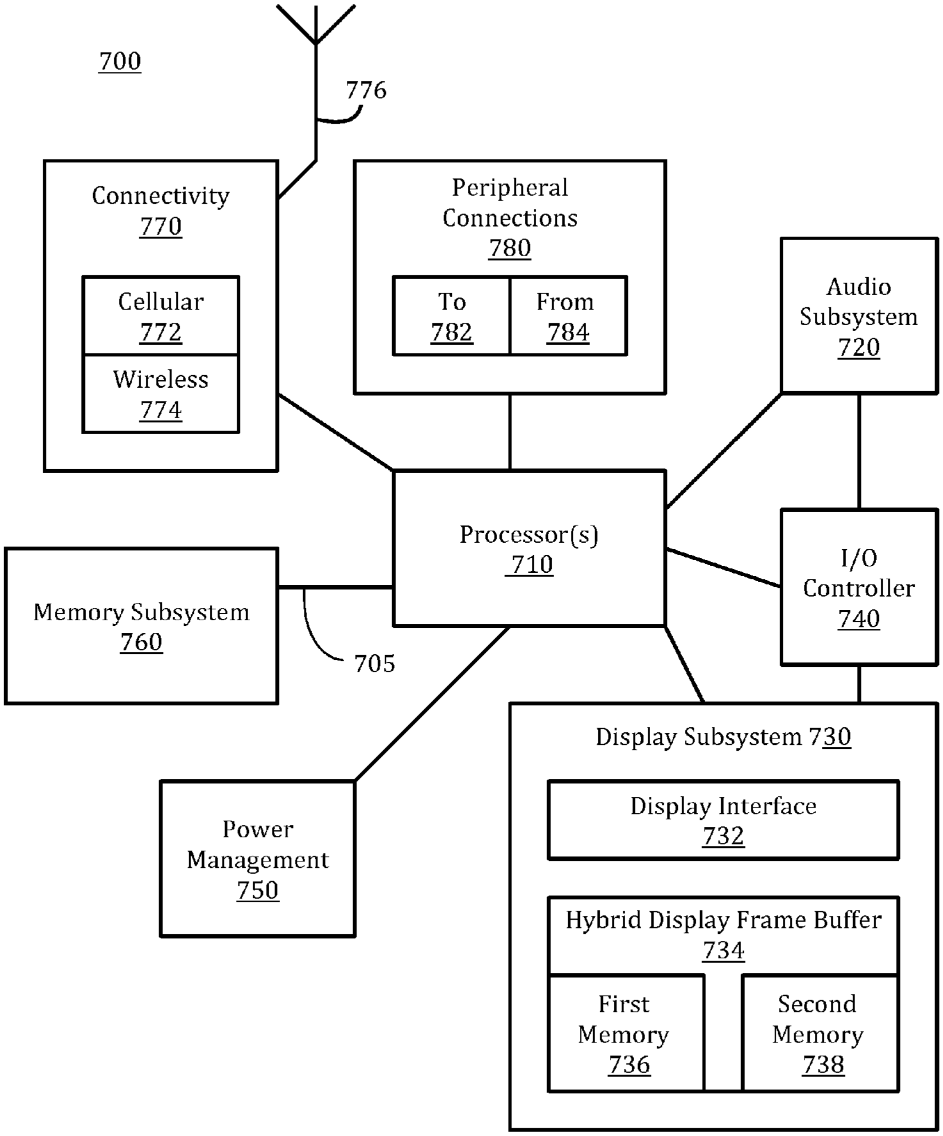
FIG. 7 is an illustration of an embodiment of an apparatus or system including a hybrid display frame buffer for a video display.

FIG. 7 is an illustration of an embodiment of an apparatus or system including a hybrid display frame buffer for a video display. Computing device 700 represents a computing device including a mobile computing device, such as a laptop computer, a tablet computer (including a device having a touchscreen without a separate keyboard; a device having both a touchscreen and keyboard; a device having quick initiation, referred to as "instant on" operation; and a device that is generally connected to a network in operation, referred to as "always connected"), a mobile phone or smart phone, a wireless-enabled e-reader, or other wireless mobile device. It will be understood that certain of the components are shown generally, and not all components of such a device are shown in device 700. The components may be connected by one or more buses or other connections 705.

Device 700 includes processor 710, which performs the primary processing operations of device 700. Processor 710 can include one or more physical devices, such as microprocessors, application processors, microcontrollers, programmable logic devices, or other processing means. The processing operations performed by processor 710 include the execution of an operating platform or operating system on which applications, device functions, or both are executed. The processing operations include operations related to I/O (input/output) with a human user or with other devices, operations related to power management, operations, or both related to connecting device 700 to another device. The processing operations may also include operations related to audio I/O, display I/O, or both.

In one embodiment, device 700 includes audio subsystem 720, which represents hardware (such as audio hardware and audio circuits) and software (such as drivers and codecs) components associated with providing audio functions to the computing device. Audio functions can include speaker, headphone, or both such audio output, as well as microphone input. Devices for such functions can be integrated into device 700, or connected to device 700. In one embodiment, a user interacts with device 700 by providing audio commands that are received and processed by processor 710.

Display subsystem 730 represents hardware (such as display devices) and software (such as drivers) components that provide a display having visual, tactile, or both elements for a user to interact with the computing device. Display subsystem 730 includes display interface 732, which includes the particular screen or hardware device used to provide a display to a user. In one embodiment, display interface 732 includes logic separate from processor 710 to perform at least some processing related to the display. In one embodiment, display subsystem 730 includes a touch screen device that provides both output and input to a user.

In some embodiments, the display subsystem further includes a hybrid display frame buffer 734 including a first memory component or element 736 including a first type of memory and a second memory component or element 738 including a second type of memory, where the first type of memory has a symmetric power characteristic for reading and writing data, such as DRAM, and the second type of memory has an asymmetric power characteristic for reading and writing data, such as PCM.

I/O controller 740 represents hardware devices and software components related to interaction with a user. I/O controller 740 can operate to manage hardware that is part of audio subsystem 720, a display subsystem 730, or both such subsystems. Additionally, I/O controller 740 illustrates a connection point for additional devices that connect to device 700 through which a user might interact with the system. For example, devices that can be attached to device 700 might include microphone devices, speaker or stereo systems, video systems or other display device, keyboard or keypad devices, or other I/O devices for use with specific applications such as card readers or other devices.

As mentioned above, I/O controller 740 may interact with audio subsystem 720, display subsystem 730, or both such subsystems. For example, input through a microphone or other audio device can provide input or commands for one or more applications or functions of device 700. Additionally, audio output can be provided instead of or in addition to display output. In another example, if display subsystem includes a touch screen, the display device also acts as an input device, which can be at least partially managed by I/O controller 740. There can also be additional buttons or switches on device 700 to provide I/O functions managed by I/O controller 740.

In one embodiment, I/O controller 740 manages devices such as accelerometers, cameras, light sensors or other environmental sensors, or other hardware that can be included in device 700. The input can be part of direct user interaction, as well as providing environmental input to the system to influence its operations (such as filtering for noise, adjusting displays for brightness detection, applying a flash for a camera, or other features).

In one embodiment, device 700 includes power management 750 that manages battery power usage, charging of the battery, and features related to power saving operation.

In some embodiments, memory subsystem 760 includes memory devices for storing information in device 700. The processor 710 may read and write data to elements of the memory subsystem 760. Memory can include nonvolatile (having a state that does not change if power to the memory device is interrupted), volatile (having a state that is indeterminate if power to the memory device is interrupted) memory devices, or both such memories. Memory 760 can store application data, user data, music, photos, documents, or other data, as well as system data (whether long-term or temporary) related to the execution of the applications and functions of system 700.

Connectivity 770 includes hardware devices (e.g., connectors and communication hardware for wireless communication, wired communication, or both) and software components (e.g., drivers, protocol stacks) to enable device 700 to communicate with external devices. The device could be separate devices, such as other computing devices, wireless access points or base stations, as well as peripherals such as headsets, printers, or other devices.

Connectivity 770 can include multiple different types of connectivity. To generalize, device 700 is illustrated with cellular connectivity 772 and wireless connectivity 774. Cellular connectivity 772 refers generally to cellular network connectivity provided by wireless carriers, such as provided via 4G/LTE (Long Term Evolution), GSM (global system for mobile communications) or variations or derivatives, CDMA (code division multiple access) or variations or derivatives, TDM (time division multiplexing) or variations or derivatives, or other cellular service standards. Wireless connectivity 774 refers to wireless connectivity that is not cellular, and can include personal area networks (such as Bluetooth), local area networks (such as Wi-Fi), wide area networks (such as WiMax), and other wireless communications. Connectivity may include one or more omnidirectional or directional antennas 776.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (such as downloading, uploading, changing, or synchronizing) content on device 700. Additionally, a docking connector can allow device 700 to connect to certain peripherals that allow device 700 to control content output, for example, to audiovisual or other systems.

In addition to a proprietary docking connector or other proprietary connection hardware, device 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Figure 8:
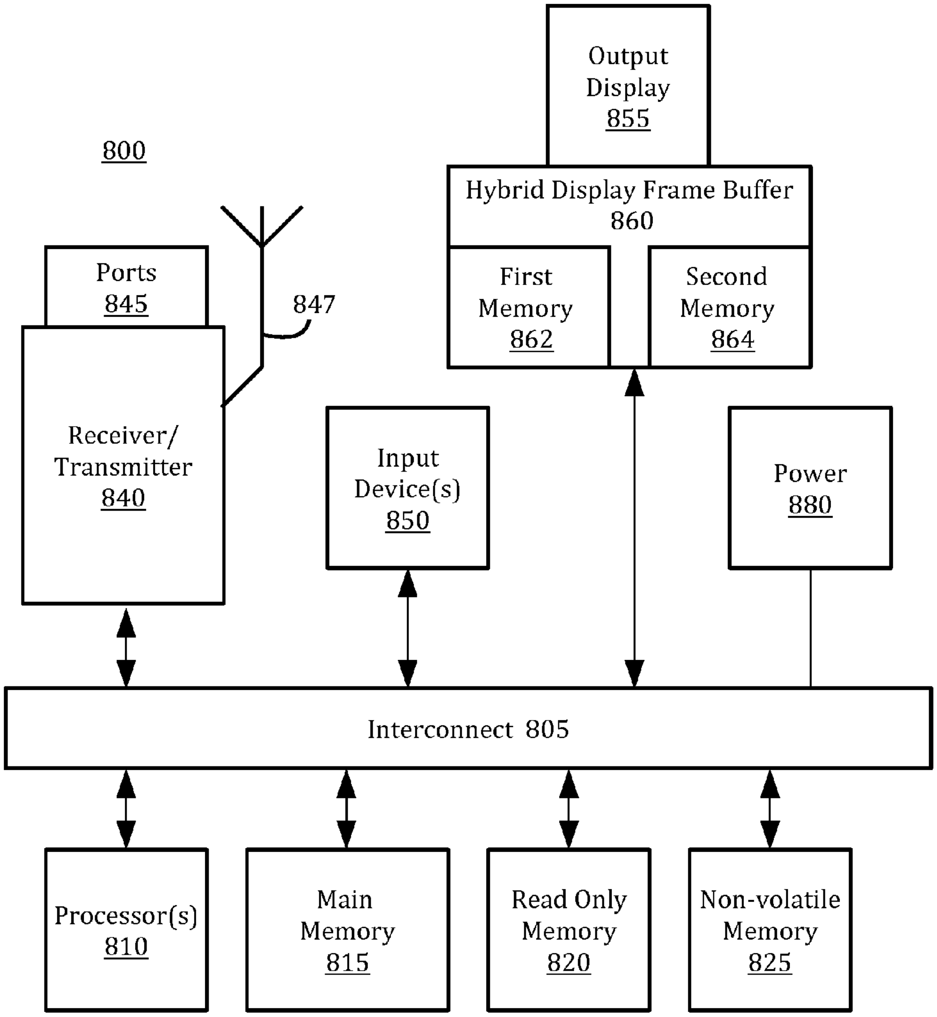
FIG. 8 illustrates an embodiment of a computing system including a hybrid display frame buffer for a video display.

FIG. 8 illustrates an embodiment of a computing system including a hybrid display frame buffer for a video display. The computing system may include a computer, server, game console, or other computing apparatus. In this illustration, certain standard and well-known components that are not germane to the present description are not shown. Under some embodiments, the computing system 800 comprises an interconnect or crossbar 805 or other communication means for transmission of data. The computing system 800 may include a processing means such as one or more processors 810 coupled with the interconnect 805 for processing information. The processors 810 may comprise one or more physical processors and one or more logical processors. The interconnect 805 is illustrated as a single interconnect for simplicity, but may represent multiple different interconnects or buses and the component connections to such interconnects may vary. The interconnect 805 shown in FIG. 8 is an abstraction that represents any one or more separate physical buses, point-to-point connections, or both connected by appropriate bridges, adapters, or controllers.

In some embodiments, the computing system 800 further comprises a random access memory (RAM) or other dynamic storage device or element as a main memory 815 for storing information and instructions to be executed by the processors 810. RAM memory includes dynamic random access memory (DRAM), which requires refreshing of memory contents, and static random access memory (SRAM), which does not require refreshing contents, but at increased cost. In some embodiments, main memory may include active storage of applications including a browser application for using in network browsing activities by a user of the computing system. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory.

The computing system 800 also may comprise a read only memory (ROM) 820 or other static storage device for storing static information and instructions for the processors 810. The computing system 800 may include one or more non-volatile memory elements 825 for the storage of certain elements.

One or more transmitters or receivers 840 may also be coupled to the interconnect 805. In some embodiments, the computing system 800 may include one or more ports 845 for the reception or transmission of data. The computing system 800 may further include one or more omnidirectional or directional antennas 847 for the reception of data via radio signals.

In some embodiments, the computing system 800 includes one or more input devices 850, where the input devices include one or more of a keyboard, mouse, touch pad, voice command recognition, gesture recognition, sensors or monitors (including sensors or monitors providing power and performance data), or other device for providing an input to a computing system.

The computing system 800 may also be coupled via the interconnect 805 to an output display 855. In some embodiments, the display 855 may include a liquid crystal display (LCD) or any other display technology, for displaying information or content to a user. In some environments, the display 855 may include a touch-screen that is also utilized as at least a part of an input device. In some environments, the display 855 may be or may include an audio device, such as a speaker for providing audio information.

In some embodiments, the output display 855 is coupled with a hybrid display frame buffer 860 including a first memory component or element 862 including a first type of memory and a second memory component or element 864 including a second type of memory, the type of memory and the second type of memory having different power characteristics for reading and writing data, such as, for example, the first type of memory having a symmetric power characteristic for reading and writing data and the second type of memory having an asymmetric power characteristic for reading and writing data.

The computing system 800 may also comprise a power device or system 880, which may comprise a power supply, a battery, a solar cell, a fuel cell, or other system or device for providing or generating power. The power provided by the power device or system 880 may be distributed as required to elements of the computing system 800.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable storage medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

In some embodiments, an apparatus includes a first logic to split a video image into a first data portion and a second data portion; a display frame buffer including a first memory component having a first type of memory and a second memory component having a second type of memory, the first logic to write the first data portion to the first memory component and the second data portion to the second memory component; and a second logic to read the first data portion from the first memory component and the second data component from the second memory component, and to combine the first data portion and the second data portion to generate a combined video image.

In some embodiments, the apparatus further includes a display panel, the second logic to provide the combined video image to the display panel for display.

In some embodiments, the first type of memory of the apparatus has a symmetric power characteristic for read and write accesses and the second type of memory has an asymmetric power characteristic for read and write accesses. In some embodiments, the first type of memory is DRAM, and the second type of memory is phase change memory (PCM). In some embodiments, the first data portion includes more active data than the second data portion. In some embodiments, the first data portion includes a video, and the second data portion includes a web page.

In some embodiments, the first logic of the apparatus is to identify the first data portion and the second data portion based on software information regarding the video image. In some embodiments, the second logic is to identify the first data portion and the second data portion based on analysis of the video image by the apparatus. In some embodiments, the second logic of the apparatus is to combine the first data portion and the second data portion based on a same basis as the first logic utilizes for splitting the video image.

In some embodiments, a method includes splitting a video image into a first data portion and a second data portion; writing the first data portion to a first display frame buffer having a first type of memory; writing the second data portion to a second display frame buffer having a second type of memory; reading the first data portion and the second data portion; and combining the first data portion and the second data portion to generate a combined video image.

In some embodiments, writing the first data portion to a first display frame buffer includes writing to a memory with a symmetric power characteristic for read and write accesses. In some embodiments, writing the second data portion to a second display frame buffer includes writing to a memory with an asymmetric power characteristic for read and write accesses.

In some embodiments, splitting the video image into the first data portion and the second data portion includes determining a high active region of the video image and a low active region of the video image.

In some embodiments, the method further includes displaying the combined video image on a display panel.

In some embodiments, a system includes an application processor to process video data for the system; and a display subsystem for display of the video data. In some embodiments, the display subsystem includes a first logic to split a video image into a first data portion and a second data portion; a display frame buffer including a first type of memory and a second type of memory, the first logic to write the first data portion to the first type of memory and the second data portion to the second type of memory; a second logic to read the first data portion from the first type of memory and the second data portion from the second type of memory, and to combine the first data portion and the second data portion to generate a combined video image; and a display panel, the second logic to provide the combined video image to the display panel for display.

In some embodiments, the first type of memory has a symmetric power characteristic for reading and writing data and the second type of memory has an asymmetric power characteristic for reading and writing data. In some embodiments, wherein the first type of memory of the system is DRAM and the second type of memory is PCM. In some embodiments, the first data portion includes dynamic data and the second data portion includes static data.

In some embodiments, a computer-readable storage medium having stored thereon data representing sequences of instructions that, when executed by a processor, cause the processor to perform operations includes splitting a video image into a first data portion and a second data portion; writing the first data portion to a first display frame buffer having a first type of; writing the second data portion to a second display frame buffer having a second type of memory; reading the first data portion from the first frame buffer and the second data portion from the second frame buffer; and combining the first data portion and the second data portion to generate a combined video image.

In some embodiments, the first type of memory has a first power characteristic for reading and writing data and the second type of memory has a second power characteristic for reading and writing data. In some embodiments, the first type of memory has a symmetric power characteristic for reading and writing data and the second type of memory has an asymmetric power characteristic for reading and writing data. In some embodiments, the first type of memory is DRAM and the second type of memory is PCM.

What is claimed is:

1. An apparatus comprising:

a signal splitter to split a video image into a first data portion and a second data portion based on type of data or activity of data within the video image, wherein the first data portion includes more active data than the second data portion;

a display frame buffer including a first memory component having a first type of memory and a second memory component having a second type of memory, the signal splitter to write the first data portion from the splitting of the video image to the first memory component and the second data portion from the splitting of the video image to the second memory component, wherein the first type of memory has a first power characteristic for power consumed in read and write accesses and the second type of memory has a second power characteristic for power consumed in read and write accesses, the first power characteristic being a symmetric power characteristic for read and write accesses and the second power characteristic being an asymmetric power characteristic for read and write accesses; and a signal combiner to read the first data portion from the first memory component and the second data component from the second memory component, and to combine the first data portion and the second data portion to generate a combined video image.

2. The apparatus of claim 1, further comprising a display panel, the signal combiner to provide the combined video image to the display panel for display.

3. The apparatus of claim 1, wherein the first type of memory is dynamic random access memory (DRAM).

4. The apparatus of claim 1, wherein the second type of memory is phase change memory (PCM).

5. The apparatus of claim 1, wherein the first data portion includes a video.

6. The apparatus of claim 1, wherein the second data portion includes a web page.

7. The apparatus of claim 1, wherein the signal splitter is to identify the first data portion and the second data portion based on software information regarding the video image.

8. The apparatus of claim 1, wherein the signal splitter is to identify the first data portion and the second data portion based on analysis of the video image by the apparatus.

9. The apparatus of claim 1, wherein the signal combiner is to combine the first data portion and the second data portion based on a same basis as the signal splitter utilizes for splitting the video image.

10. The apparatus of claim 1, wherein the first type of memory consumes less than twice as much power for a write access than a read access, and the second type of memory consumes more than twice as much power for a write access than a read access.

11. The apparatus of claim 1, wherein the first type of memory consumes more power than the second type of memory for a read access, and wherein the first type of memory consumes less power than the second type of memory for a write access.

12. A method comprising:

splitting a video image into a first data portion and a second data portion based on type of data or activity of data within the video image, wherein the first data portion includes more active data than the second data portion;

writing the first data portion from the splitting of the video image to a first display frame buffer having a first type of memory, wherein the first type of memory has a first power characteristic for power consumed in read and write accesses;

writing the second data portion from the splitting of the video image to a second display frame buffer having a second type of memory, wherein the second type of memory has a second power characteristic for power consumed in read and write accesses, the first power characteristic being a symmetric power characteristic for read and write accesses and the second power characteristic being an asymmetric power characteristic for read and write accesses;

reading the first data portion and the second data portion; and combining the first data portion and the second data portion to generate a combined video image.

13. The method of claim 12, wherein splitting the video image into the first data portion and the second data portion includes determining a high active region of the video image and a low active region of the video image.

14. The method of claim 12, further comprising displaying the combined video image on a display panel.

15. A system comprising:

a processor to process video data for the system; and a display subsystem to display the video data, the display subsystem including:

a signal splitter to split a video image into a first data portion and a second data portion based on type of data or activity of data within the video image, wherein the first data portion includes more active data than the second data portion, a display frame buffer including a first type of memory and a second type of memory, the signal splitter to write the first data portion from the splitting of the video image to the first type of memory and the second data portion from the splitting of the video image to the second type of memory, wherein the first type of memory has a first power characteristic for power consumed in read and write accesses and the second type of memory has a second power characteristic for power consumed in read and write accesses, the first power characteristic being a symmetric power characteristic for read and write accesses and the second power characteristic being different, a signal combiner to read the first data portion from the first type of memory and the second data portion from the second type of memory, and to combine the first data portion and the second data portion to generate a combined video image, and a display panel, the signal combiner to provide the combined video image to the display panel for display.

16. The system of claim 15, wherein the first type of memory is dynamic random access memory (DRAM).

17. The system of claim 15, wherein the second type of memory is phase change memory (PCM).

18. The system of claim 15, wherein the first data portion includes dynamic data and the second data portion includes static data.

19. A non-transitory computer-readable storage medium having stored thereon data representing sequences of instructions that, when executed by a processor, cause the processor to perform operations comprising:

splitting a video image into a first data portion and a second data portion based on type of data or activity of data within the video image, wherein the first data portion includes more active data than the second data portion;

writing the first data portion from the splitting of the video image to a first display frame buffer having a first type of memory, wherein the first type of memory has a first power characteristic for power consumed in read and write accesses;

writing the second data portion from the splitting of the video image to a second display frame buffer having a second type of memory, wherein the second type of memory has a second power characteristic for power consumed in read and write accesses, the first power characteristic being a symmetric power characteristic for read and write accesses and the second power characteristic being an asymmetric power characteristic for read and write accesses;

reading the first data portion from the first frame buffer and the second data portion from the second frame buffer; and combining the first data portion and the second data portion to generate a combined video image.

20. The medium of claim 19, wherein the first type of memory is dynamic random access memory (DRAM).

21. The medium of claim 19, wherein the second type of memory is phase change memory (PCM).

* * * * *